July 25, 1961
C. W. HELSTROM
BILLET SEPARATOR
2,993,606
Filed Sept. 24, 1958
2 Sheets-Sheet 1
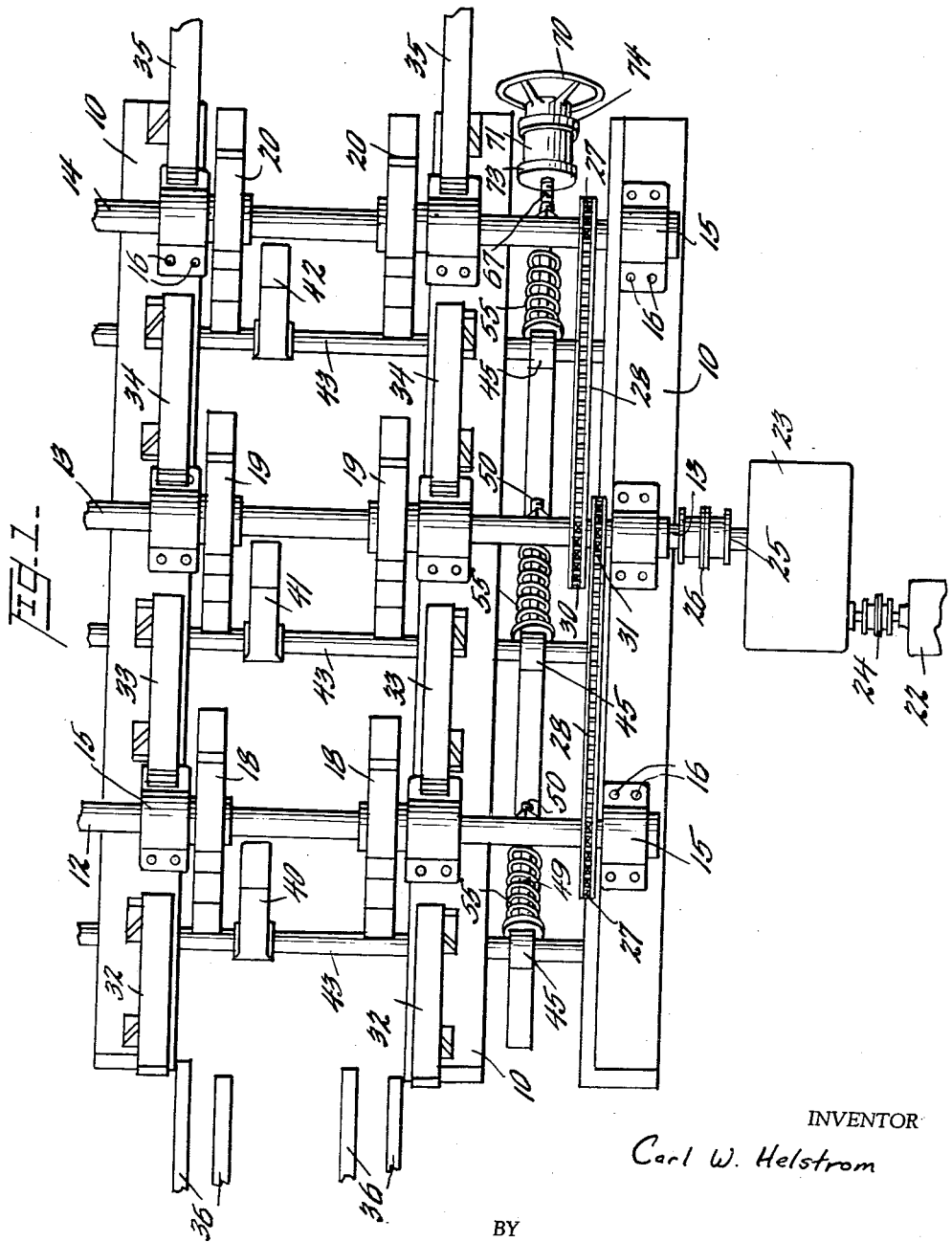
INVENTOR
Carl W. Helstrom
BY
Watson, Cole, Grindle & Watson
ATTORNEY July 25, 1961
C. W. HELSTROM
2,993,606
BILLET SEPARATOR
Filed Sept. 24, 1958
2 Sheets-Sheet 2
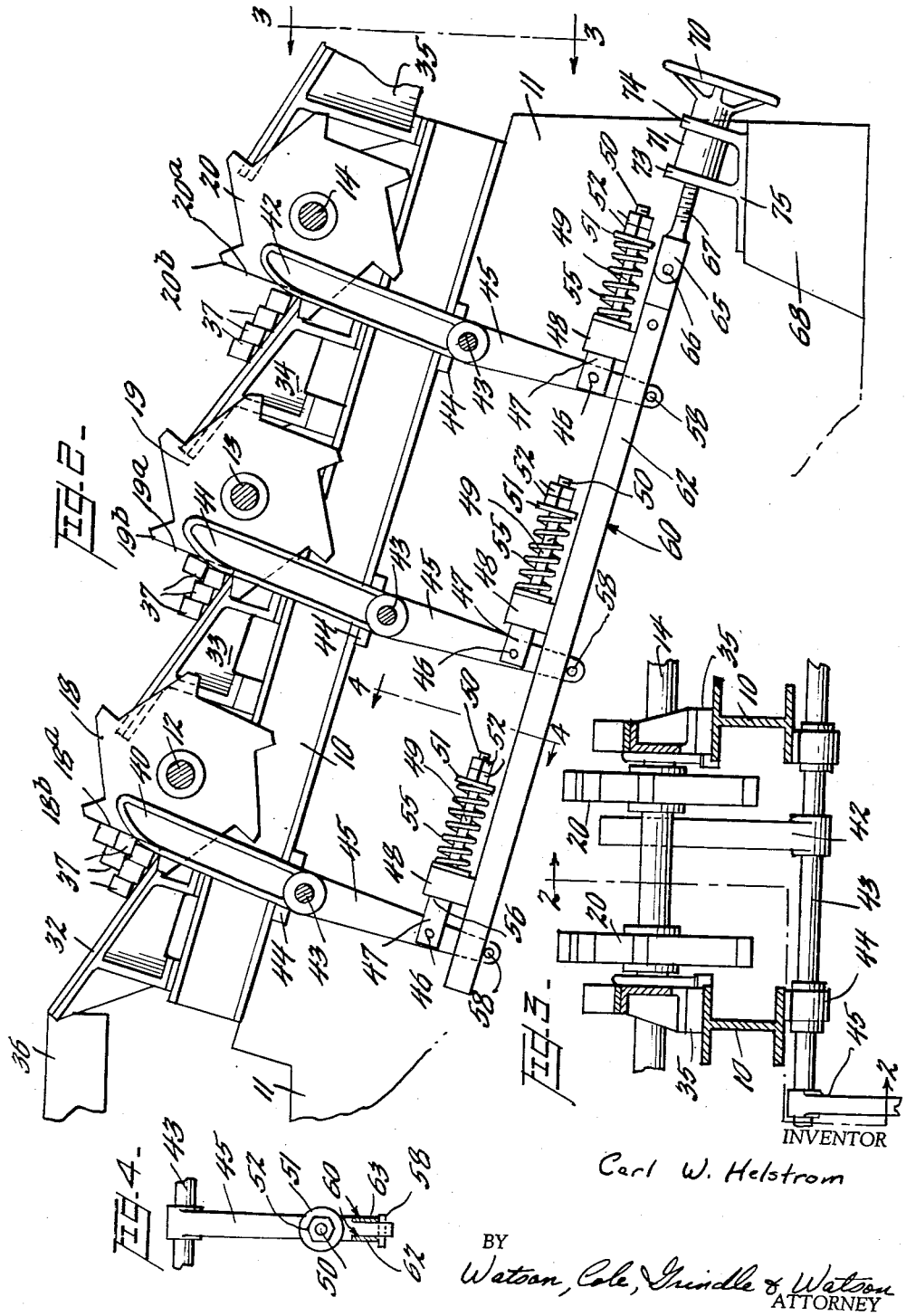
INVENTOR
Carl W. Helstrom
BY Watson, Cole, Grindle & Watson
ATTORNEY

United States Patent Office 2,993,606
Patented July 25, 1961

2,993,606
BILLET SEPARATOR
Carl W. Helstrom, Easton, Pa., assignor to Treadwell Engineering Company, Easton, Pa., a corporation of Pennsylvania
Filed Sept. 24, 1958, Ser. No. 763,061
10 Claims. (Cl. 214—1)

This invention relates to apparatus for handling billets and the like and more particularly to a mechanism for selectively discharging billets.

In the fabrication of metals, it is often necessary to discharge or feed individual members of a series of bars or billets which are deposited by some convenient handling device, such as an electromagnet. When a group of these billets is transported by an electromagnet and deposited on a feeding device, such as a walking bar type feeding device, the billets will be fed from this device in irregular groups. It would be impractical to feed the billets in such irregular groups to any subsequent apparatus employed in the manufacture of metal articles. For example, it would be impractical to feed a furnace with irregular quantities of billets. Similarly, it would be impractical to feed irregular quantities of billets to a rolling mill or a shearing device.

Accordingly, it is an object of this invention to provide a billet separator which selectively feeds individual billets from a group of billets fed to the separator.

It is another object of this invention to provide a billet separator which is simple in structure yet rugged in construction.

It is another object of this invention to provide an apparatus for reliably feeding individual billets from a group of billets.

Briefly in accordance with aspects of this invention, the billets separator includes a framework in which the top members are sloping in one direction. A number of shafts are rotatably mounted adjacent the top of this sloping framework. Each of these shafts has a group of toothed wheels secured to them with all of the teeth of the wheels in a group radially aligned. The shafts are spaced apart on the framework and angular members are disposed on either side of the toothed wheels, each sloping in the same general direction as the top of the framework. With such an arrangement, the combination of toothed wheels and sloping angular members acts as a cascade for the billets.

If a number of billets are fed to the uppermost angular member, they would slide down the angular member to a point adjacent the teeth of the first group of toothed wheels. These toothed wheels will pick up some of the billets and deposit them on the top of the next angular member. These billets will now slide down the second angular member and a few of these billets will then be picked up by the second group of toothed wheels. The second group of toothed wheels repeats the process of lifting and depositing a less number of the billets on a third angular member. This third angular member causes the billets to slide into engagement with the third group of toothed wheels. The third group of toothed wheels lifts the billets, one at a time, and deposits them upon a subsequent angular member or other conveying system which conveys the individual billet away from the separator.

Advantageously, each of the toothed wheels has associated therewith an effective tooth depth control device. These effective tooth depth control devices include arms pivotally mounted in the region between the angular members and the subsequent group toothed wheels. These arms are normally retained in a position slightly ahead of the root of the teeth of the associated toothed wheel.

The "effective tooth depth" may be defined as "that distance, measured along the tooth, between the front or billet engaging surface of the associated arm and the end of the tooth." It is this distance which determines the "bite" of the tooth. Stated in another manner, it is this effective length of the tooth which engages the billets. In order to separate the billets, it is important that the effective tooth depth be equal to or slightly less than the width of the billets. Also, since the machine must be flexible and adapted to handle billets of different sizes, it is important that there be some provision for varying the effective tooth depth of the toothed wheels. Further, the effective tooth depth of all the toothed wheels should be the same so that each wheel will only pick up a stack of billets, one billet in width.

Advantageously, each of these tooth depth control devices are linked to a common linkage so that the effective tooth depths of each of the groups of toothed wheels can be controlled by a single adjustment of the common linkage. If the billets, which are often massive, were allowed to impart their full impact to the arms or to the arms and the toothed wheels, these elements would frequently have to be replaced. Advantageously, the effective tooth depth control linkage includes springs which absorb the shock received by the linkage from the billets as they slide down the angular members. These springs are mounted coaxially of the links which are connected to the arms and are retained on this link in a position to be compressed by longitudinal movement of the link. A spring base plate is slidably mounted on this link intermediate the ends of the link and this base plate is secured to an elongated link member which is common to all of the arms. Advantageously, this elongated common link is adjustably connected to a stationary mounting. Accordingly, adjustment of this connection positions each of the stop arms.

Accordingly, it is a feature of this invention to employ as a billet separator a number of groups of toothed wheels, each secured to an axle which is rotatably mounted in the region of the top of a framework and an effective tooth depth control linkage adjacent each of the groups of toothed wheels.

It is another feature of this invention to employ as a billet separator a number of groups of toothed wheels rotatably mounted on a framework and a common linkage system including an arm extending to a region adjacent each of the tooth wheels such that a single adjustment of the common linkage system controls the effective depth of the teeth of each of the toothed wheels.

It is still a further feature of this invention to employ a linkage including a resilient member to control the effective depth of a toothed wheel of a billet separator such that the arms of the linkage which extend to a region adjacent the teeth of the toothed wheel act as a resilient stop for the billets thus preventing the billets from damaging the toothed wheels while controlling the effective depth of the teeth of the toothed wheels.

These and various other objects and features of this invention will become apparent when read in conjunction with the accompanying drawing in which:

FIGURE 1 is a plan view of a portion of one illustrative embodiment of this invention;

FIGURE 2 is a view in elevation, partly in section, taken approximately along the line 2—2 of FIGURE 3;

FIGURE 3 is an end view in elevation, partly in section, of a portion of the device in FIGURE 2;

FIGURE 4 is an end view in elevation, partly in section, of a portion of the linkage mechanism shown in FIGURE 2.

Referring now to FIGURE 1, there is depicted a pair of frame members 10 which may be in the form of I beams. These beams 10 are mounted at an angle on supports 11. Axles 12, 13, and 14 are rotatably mounted on members 10. These axles 12, 13, and 14 are journaled in suitable bearings, not shown, which are held by bearing supports 15 secured to the members 10 by suitable means, such as bolts 16. Shafts 12, 13, and 14 have a group of toothed wheels 18, 19 and 20, respectively, secured thereto.

A source of driving power indicated as a motor 22 is employed to rotate the shafts 10. The motor 12 is coupled to a suitable gear reducing system, indicated generally by block 23, through a coupling 24. The output shaft 25 of the gear reducing system 22 is connected to shaft 13 by means of a suitable coupling 26. The shafts 12 and 14 have secured thereto sprocket wheels 27 which are operatively connected to the driven shaft 13 by means of drive chains 28 and sprocket wheels 30 and 31 secured to the driven shaft 13. Angular members 32, 33, 34, and 35 are secured to the frame members 10 by any convenient means, such as by welding. These angular members act as skids to feed the billets relative to the toothed wheels 18, 19, and 20.

As seen in FIGURE 2, angular members 32, 33, 34, and 35 are mounted on the frame members 10 in a manner such that they slope in the same direction as that of the frame members 10. A feed device, such as a walking bar 36 is employed to feed the billets 37 to angular members 32. It is, of course, understood that other forms of feeding devices may be employed to feed billets to the billets separator. Billets may be supplied to the walking bar system 36 by any convenient means, such as by an electromagnet type crane. Angular members 32, 33, and 34 feed the billets to toothed wheels 18, 19, and 20, respectively. Angular member 35 feeds the billets away from toothed wheels 20. These angular members might be formed integrally with the frame members 10 or they might be omitted by utilizing the frame members 10 as skids.

A linkage system forms a part of the billets separator and this linkage system includes a number of arms 40, 41, and 42, each secured to one of the shafts 43. A single arm 40 is shown which co-operates with toothed wheels 18 in a manner which will be subsequently explained. In practice, it has been found that one arm 40 for each two or three wheels 18 is sufficient to produce the desired co-operation. Similarly, one arm 41 and one arm 42 is sufficient for two or three toothed wheels 19 and 20, respectively. These shafts 43 are rotatably mounted on the lower portion of frame members 10 by means of bearings, not shown, which bearings are enclosed in bearing housings 44. A first group of linking arms 45 are connected by means of pins 46 to a member of second group linking arms 47, which are slidably mounted in individual spring base plates 48. Links 47 each include a reduced portion 49 which terminates in a threaded portion 50. A washer 51 and a pair of nuts 52 are mounted on the threaded portion 50; the nuts forming a locking device for retaining washer 51 on reduced portion 49. A helical spring 55 is maintained in compression between spring base member 48 and washer 51. Helical spring 55 retains the link 47 in a position such that its shoulder 56 engages the spring base member 48. Pins 58 are secured in the region of the terminal end of each of the arm members 45 and serve as supports or guides for common link arm 60 which is a part of the linkage. Arm 60 comprises a pair of spaced apart members 62 and 63, shown in section in FIGURE 4. Each of the spring base members 48 are secured to the members 62 and 63 by suitable means, such as by welding. Arm 60 is pivotally connected to a link 65 by means of a pin 66. Link 55 is threaded and extends as an axle through a wheel 70. The control portion 71 of wheel 70 is rotatably mounted on a supporting member 68 by means of a pair of cylindrical members 73 and 74 which are secured to a base plate 75. A wheel 70 has internal threads, not shown, which threadably engage the reduced threaded portion 67 of link 65 such that rotation of the hand wheel 70 translates the linkage 60 from left to right or vice versa as viewed in FIGURE 2.

Each of the arm members 40, 41, and 42 lies in a plane substantially tangential the root 18a, 19a, and 20a of the teeth of associated toothed wheels 18, 19, and 20, respectively. These arms will be advanced, or pivoted counterclockwise, as viewed in FIGURE 2, when the common link 60 is moved to the right. As these arms 40, 41, and 42 are pivoted counterclockwise, the effective depth of the teeth 18b, 19b, and 20b on the toothed wheels 18, 19, and 20, respectively, will be decreased, whereas when arm members 40, 41, and 42 are moved to the right, the effective depth of the teeth on the wheels 18 will be increased. FIGURE 2 illustrates the effective length or depth of the teeth. The teeth which are about to engage the billets have an effective length equal to the distance from the front or left-hand edge of the arms 40, 41, and 42 and the ends of the teeth 18b, 19b, and 20b. When a group of billets slide down one of the angular members 33, they first come in contact with arm members 41. Arm members 41 and the connected helical springs 55 absorb the impact of the billets and thus prevent the billets from damaging the toothed wheels 18. After the impact has been absorbed, the arms return to their initial, or effective tooth depth controlling position.

The operation of the billets separator is as follows: A load of billets are first deposited on the walking bar system 36. The walking bar system is operated in a well known manner and deposits a number of billets 37 on angular member 32. Assuming for a moment that six billets 37 are deposited on slide 32, these billets slide down and engage the first stop arm 40. This arm 40 absorbs the impact by means of the spring 55 and then retains the billets so that the width of only one billet 37 is within the path of the teeth 18b of the first toothed wheel 18 in a manner shown in FIGURE 2. Since the linkage system 40—45—60 and its control wheel 70 have been adjusted so that the effective depth of the teeth 19 is that of the width of one billet, then the first toothed wheel 18 will pick up the three billets stacked adjacent the root 18a of toothed wheel 18. Assuming that one extra billet is erroneously picked up, these four billets will be deposited on angular member 33 and will slide into engagement with the second group of toothed wheels 19 in a manner shown in FIGURE 2.

When the second group 19 of toothed wheels rotates again, only two billets 37 will be picked up since the effective tooth depth of teeth 19b is also equal to the width of one billet. These billets 38 will be deposited on the third angular member 34. These billets 37 will now slide into engagement with the third group of toothed wheels 20 in a manner shown in FIGURE 2. When this third group of toothed wheels 20 rotates, only one billet will be picked up since the effective depth of the teeth 20b is only the width of one billet and only the one billet is resting against arm 42. Thus, only one billet will be transmitted at any given time to the next angular member 35.

Accordingly, it will be aparent that this billet separator when adjusted to have an effective tooth depth equal to the width of one billet will deliver only one billet at a time over the last angular member 35 regardless of the number of billets supplied to the first angular member 32. Throughout this explanation of the operation of this apparatus, the most adverse possibilities have been assumed. For example, the first wheels 18 would most frequently pick up one of the three adjacent billets 37.

It is also apparent that by employing this linkage system to control the effective depth of the teeth, extreme accuracy of operation is assumed. Further, by utilizing a spring or resilient member in the linkage connecting these stop members, the stop members perform the dual function of protecting the toothed wheels by absorbing the shock of the sliding billets and controlling the effective depth of the teeth of the toothed wheel by reason of their normal position.

While I have shown and described various embodiments of my invention, it is understood that the principles thereof may be extended to many and varied types of devices.

I claim:

1. A billet separator comprising frame means, a plurality of parallel axles rotatably mounted on said frame means, a plurality of toothed wheels secured to said axles and having teeth thereon, a plurality of stop means including members positioned adjacent said toothed wheels, means connected to said members for limiting the effective depth of said teeth and resilient means connected to said members to a depth substantially equal to the width of one billet.

2. A billet separator or the like comprising sloping frame means, a plurality of parallel axles rotatably mounted in spaced relationship on said frame means and having a plurality of toothed wheels secured thereto, a plurality of stop means pivotally mounted on said frame means adjacent said toothed wheels and means for selectively positioning said stop means for limiting the effective depth of the teeth on said toothed wheels to a depth substantially equal to the width of one billet.

3. A billet separator or the like according to claim 2 wherein said stop means comprises a plurality of elongated arms, each pivotally mounted on said frame and wherein said means for selectively positioning said stops includes an adjustable linkage connected to each of said elongated arms.

4. A billet separator according to claim 3 wherein said adjustable linkage includes spring means normally opposing the movement of said elongated arms in a direction toward the adjacent toothed wheel whereby said elongated arms act as shock absorbers to prevent the sliding billets from damaging said toothed wheels.

5. A billet separator comprising sloping frame means, a first, a second, and a third axle rotatably mounted on said frame, each axle having a group of toothed wheels secured thereto, a plurality of elongated stop members each pivotally mounted on said frame adjacent one group of said toothed wheels and adjustable linkage means, each of said stop members having one end adjacent one of said groups of toothed wheels and operatively connected to said adjustable linkage means whereby adjustment of said linkage means controls the effective depth of the teeth on said wheels to a depth substantially equal to the width of one billet.

6. A billet separator according to claim 5 wherein said adjustable linkage means includes spring means opposing the movement of said stop members toward the adjacent group of toothed wheels whereby said stop means protects the teeth of said wheels.

7. Apparatus for separating billets or the like comprising a frame, a first group of axles rotatably mounted on said frame, a plurality of toothed wheels secured to said first group of axles, a second group of axles rotatably mounted on said frame, stop means including a plurality of arms secured to said second group of axles and each extending to a region adjacent the teeth of one of the toothed wheels, a second plurality of arms each secured to one of said second groups of axles and a resilient linkage system secured to said second group of arms to absorb the impact of said billets prior to the engagement of the billets with the toothed wheels.

8. Apparatus according to claim 7 wherein said linkage system comprises a common link connected to each of said second group of arms and means for adjusting the position of said common link whereby the position of each of said stop arms is simultaneously controlled by the position of said common link.

9. Apparatus according to claim 8 wherein said linkage system includes a plurality of linkage arms, each pivotally connected to one of said second groups of arms and slidably connected to said common link.

10. A device according to claim 9 wherein said common link includes a spring base plate slidably mounted on each of said second linkage arms and a helical spring secured between each of said base plates and the end of one of said second linkages whereby said helical springs absorb the impact of said billets received by said stop arms.

References Cited in the file of this patent

UNITED STATES PATENTS

| | | |
|---|---|---|
| 651,840 | Fahrney | June 19, 1900 |
| 2,820,573 | McConnell | Jan. 21, 1958 |